Nov. 7, 1972   MASANORI HANAOKA   3,702,122
LIQUID LEVEL CONTROLLING APPARATUS
Filed Dec. 15, 1970   2 Sheets-Sheet 1
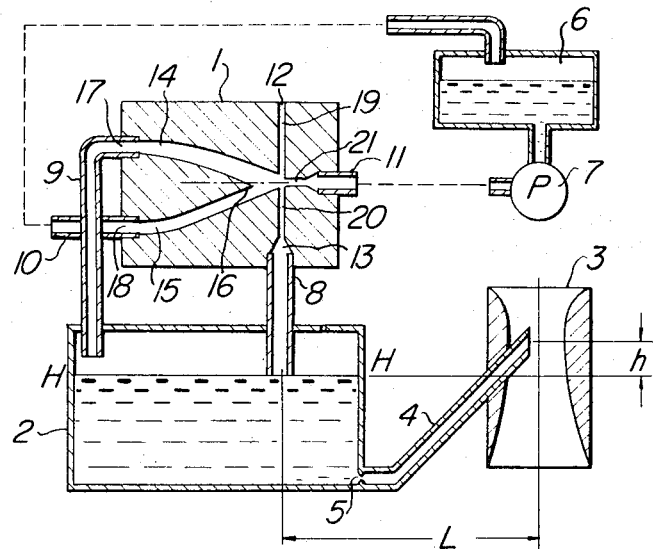
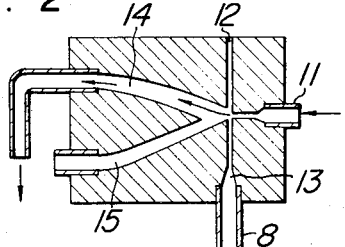
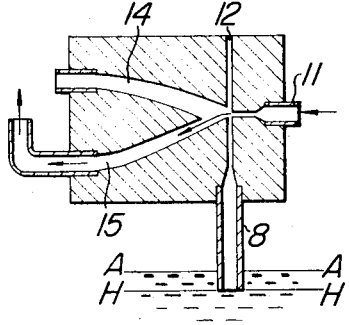
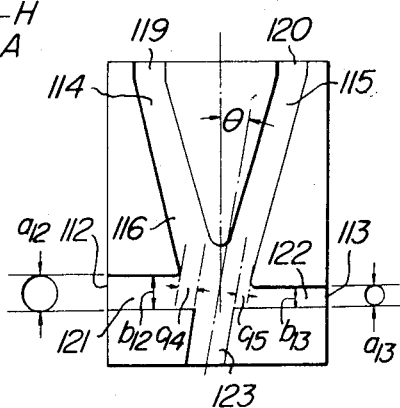
INVENTOR

United States Patent Office 3,702,122
Patented Nov. 7, 1972

3,702,122
LIQUID LEVEL CONTROLLING APPARATUS
Masanori Hanaoka, Toyota, Japan, assignor to Toyota Jidosha Kogyo Kabushiki Kaisha, Toyota-shi, Japan
Filed Dec. 15, 1970, Ser. No. 98,405
Claims priority, application Japan, Mar. 14, 1970, 45/21,605; July 3, 1970, 45/58,432
Int. Cl. F15c 1/08
U.S. Cl. 137—81.5          6 Claims

ABSTRACT OF THE DISCLOSURE

A wall attachment logic element is interposed between a fuel tank and a fuel regulating container for the purpose of controlling the liquid level in said fuel regulating container, and when the liquid level therein has fallen below a set level, a pressure variation occurs at the point of divergence of the ducts formed in said fluidics or fluidic element to direct the liquid being delivered from a fuel pump so as to be introduced into a conduit leading to said container, whereas when the liquid level has risen above said set level, the liquid passes through a separate duct in said fluidics and is returned to said fuel tank through a return pipe, and concurrently the liquid in said container is sucked up and delivered into the return pipe, whereby the surface of the liquid in the container may be maintained at the set level.

---

The present invention relates to a liquid level controlling apparatus using a wall attachment logic element, and more particularly to an apparatus capable of controlling a liquid level with high responsiveness, using a wall attachment logic element.

The liquid level controlling apparatus according to the present invention comprises a fuel tank, a fuel supply pump connected in series with said fuel tank, a wall attachment logic element or fluidic element having a plurality of ports and ducts, a fuel regulating container having a nozzle communicated with a carburetor and conduits communicating said respective elements with each other, and the flowing direction of liquid being delivered into the fluidic element is changed as the liquid level in said container varies, whereby the liquid level in the container is maintained constant and thus a variation in quantity of the fuel supplied to the carburetor is eliminated.

In internal combustion engines in particular, if the fuel level in a float chamber for a carburetor varies, the quantity of fuel being sucked into a Venturi tube will vary even when the quantity of the intake air passing through an intake pipe is constant, and consequently the fuel-air ratio deviates from the design value, resulting in a lowering of engine output, aggravation of fuel consumption and an increase of carbon monoxide and hydrocarbons in the exhaust gases. Thus, it has been strongly desired to maintain the fuel level in the float chamber constant.

Heretofore, the fuel level in the float chamber of the carburetor for internal combustion engines has been controlled by operating a throttle valve (which is usually a needle valve) in a fuel supply pipe in response to the movement of a float disposed in said float chamber.

Namely, a conventional fuel level controlling apparatus comprises a float chamber, a float, a pivot pin for supporting said float, a needle valve provided in a fuel supply pipe extending from a fuel pump to said float chamber for adjusting the cross-sectional area of said pipe, a Venturi tube, a nozzle for supplying fuel to the Venturi tube therethrough and a throttle (generally called main jet) provided between the float chamber and the nozzle. In internal combustion engines for vehicles, since the engine is not always maintained level, it is possible that the opening of the nozzle is located below the design fuel level (hereinafter referred to as set fuel level ($H_1$–$H_1$)) as a result of the engine being inclined. Upon occurrence of such condition, the fuel supply is interrupted even though a substantial negative pressure is not produced in the Venturi tube, and a satisfactory fuel-air mixture cannot be obtained. In order to avoid such condition, the apparatus is designed to get the float as close to the Venturi tube as possible. However, since the outer dimension of the float is automatically determined, for the needle valve to be operable under the buoyancy acting on the float against the discharge pressure of the fuel pump (generally 0.3–0.4 kg./cm.$^2$), the distance between said float and said Venturi tube (hereinafter represented by $\iota_1$) is determined accordingly. From this distance $\iota_1$ and the allowable angle of inclination of the vehicle, the opening of the nozzle is designed to be located, in the horizontal state of the vehicle, at a location $h_1$ above the set fuel level ($H_1$–$H_1$), so that the opening will not be lowered below said set fuel level ($H_1$–$H_1$), and the $h_1$ is usually 6–7 mm.

A fuel level controlling apparatus using this type of float, however, involves an operational delay due to the inclusion of movable elements, such as the float and the needle valve, and it is difficult to minimize the variation of fuel level. On the other hand, the fuel level should not be too high, because if the fuel level rises too high, the result will be only that the rising float causes the needle valve to close the pipe, interrupting the supply of fresh fuel into the float chamber, and a large quantity of fuel is introduced into the Venturi tube during this period, inducing the so-called overflow condition. Further, the float chamber cannot be made smaller than a certain size as the outer dimension of the float is subjected to a limitation as stated above, and hence the distance $\iota_1$ between the float chamber and the Venturi tube cannot be made shorter than a certain value. Consequently, it is impossible to maintain the fuel level accurately when the vehicle is inclined, and the fuel level cannot be controlled in any manner especially when resonance of the float is caused by a vibration imparted to the float.

The present invention has solved the above-described problems by the provision of a liquid level controlling apparatus which does not include any movable element.

According to the present invention a liquid level controlling apparatus is so designed that, when the liquid level in a container rises above or drops below a predetermined level, the flow direction of a liquid flowing through a fluidic element is changed and the liquid is directed into a return pipe or a supply pipe, whereby the liquid level in the container is adjusted.

The present invention provides a liquid level controlling apparatus which comprises a fuel tank, a fuel supply pump connected in series with said fuel tank, a fluidic element and a fuel regulating container, said fluidic element being provided with a plurality of ports in communication with conduits which connect said respective elements with each other.

The primary object of the invention is to provide a highly responsive, highly reliable and highly durable liquid level controlling apparatus by the use of a fluidic element free of movable elements.

Another object of the invention is to simplify the construction and enhance the performance of a carburetor fuel level controlling apparatus of internal combustion engines for vehicles, which undergoes an intense vibration.

FIG. 1 is an illustrative view of a liquid level controlling apparatus according to a first embodiment of the present invention;

FIG. 2 is an illustrative view showing the flow of fluid in the fluidic element when the liquid level is below a predetermined level;

FIG. 3 is an illustrative view showing the flow of fluid in the fluidic element when the liquid level is above the predetermined level;

FIG. 7 is a detailed view of the wall attachment logic element.

Figure 4:
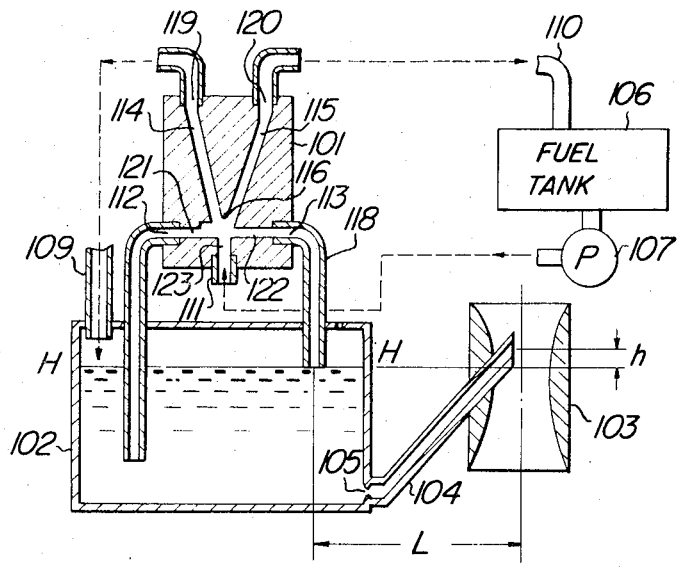
FIG. 4 is an illustrative view of a liquid level controlling apparatus according to a second embodiment of the invention.

Referring to FIG. 1 reference numeral 1 designates a wall attachment logic element, 2 a fuel regulating container (an example of the liquid level controlling container) corresponding to a conventional float chamber, 3 a Venturi tube, 4 a nozzle, 5 a throttle, 6 a fuel tank and 7 a fuel pump by which fuel is supplied from the fuel tank 6. The wall attachment logic element or fluidic element 1 has a supply port 11, control ports 12 and 13, output ports 17 and 18, a supply duct 21 in communication with said respective ports, control ducts 19 and 20, and output ducts 14 and 15. The control port 12 is open into the atmosphere. The wall attachment logic element 1 also has a splitter 16 at a location where the respective ducts are joined, which is offset with respect to the center line of the supply duct 21, so that the fluid will be introduced into the output duct 14 mostly, when the pressure acting in the control ports 12, 13 are equal. Reference numeral 8 designates a control pipe connected to the control port 13 at one end, with the other end thereof being located at a predetermined depth in the fuel regulating container 2. The position of the other end of the control pipe 8 is the position of the fuel level to be maintained in the fuel regulating container 2, i.e. a set liquid level H—H, which is established in the design stage. Reference numeral 9 designates a pipe (hereinafter referred to as a supply pipe) communicating the output port 17 with the fuel regulating container 2, and reference numeral 10 designates a pipe (hereinafter referred to as a return pipe) having one end connected with the output port 18 and the other end with the fuel tank 6. The top wall of the fuel regulating container 2 is provided with a through-hole for communicating the interior of said tank with the atmosphere. Although in the embodiment shown, the control pipe 8 extends downwardly toward the fuel level from the upper side, it will be obvious to those skilled in the art that said control pipe may be extended upwardly through the fuel, with the open end thereof projecting from the fuel level. It is also to be understood that the same functional effect may be obtained by constructing the apparatus such that the fuel admitted into the supply port partially flows into the output duct 15 even if the same pressure acts in the control ports 12, 13, and such construction is rather preferable in minimizing the operational delay which occurs in switching the output from one output port to another.

The liquid level controlling apparatus of the construction described above operates in the following manner: In FIG. 1, the fuel is first of all delivered with pressure from the fuel tank 6 into the wall attachment logic element 1 through the supply port 11 by the fuel pump 7. In the wall attachment logic element 1, the fuel is controlled and discharged into the fuel regulating container 2 through the supply pipe 9. Excess quantity of fuel is returned to the fuel tank 6 through the return pipe 10. The fuel in the fuel regulating container 2 is sucked into the Venturi tube 3 by the effect of a negative pressure developed in said Venturi tube by the velocity of air passing therethrough and mixed with the air to be supplied into the cylinders of the associated engine.

Now, the function of the wall attachment logic element 1 will be described practically with reference to FIGS. 2 and 3. FIG. 2 shows the case when the fuel in the fuel regulating container 2 is short, and FIG. 3 shows the case when the fuel in said container superfluous.

In the case of FIG. 2, the actual fuel level A—A is located below the set liquid level H—H because of fuel shortage, so that the control pipe 8 is opened into the atmosphere and the atmospheric pressure appears in the control ducts 19, 20. Therefore, the fuel supplied into the supply port 11 flows straight forward and is directed into the output duct 14 by the offset splitter 16. If, in this case, the amount of offset of the splitter 16 is small, it will be understood that not the entire fuel will flow into the output duct 14 but part thereof will flow into the output duct 15. Thus, the entire or the major part of the fuel, delivered with pressure by the fuel pump 7, is introduced into the output duct 14 and discharged into the fuel regulating container 2 through the supply pipe 9. It is a matter of course that the apparatus is designed such that the flow rate of fuel supplied into the fuel regulating container 2 through the supply pipe 9 is greater than the maximum flow rate of fuel sucked into the Venturi tube 3 through the nozzle 4.

The function of the wall attachment logic element 1 under the condition wherein the fuel in the fuel regulating container 2 is superfluous conversely, will be explained with reference to FIG. 3. When the fuel is supplied into the supply port 11 and flows therethrough at a certain velocity, a negative pressure is developed at the point of divergence of the control ducts 19, 20. Since the control port 12 is opened into the atmosphere, air is sucked into the control ducts 19, 20 through said control port 12. On the other hand, the open end of the control pipe 8 is submerged into the fuel. Therefore, the fuel in the fuel regulating container 2 is sucked into the control port 13. Consequently, the pressure developed in the control port 12 becomes lower than that in the control port 13, and hence the fuel flow passing through the supply port 11 is deflected toward the control port 13 and introduced into the output duct 15. The fuel once directed to the output duct 15 continuously flows into the output duct 15 steadily through the supply port 11 and the supply duct 21 under the Coanda effect well known in the art. Further, the fuel in the fuel regulating container 2 is sucked into the logic element through the control pipe 8 by the effect of the negative pressure developed at the point of divergence of the control ducts 19, 20 and flows into the output duct 15. In this case, the apparatus may be designed such that not the entire fuel flows into the output duct 15 but part thereof flows into the output duct 14. However, the quantity of fuel flowing into the output duct 14 is of course made smaller than the quantity of fuel sucked through the control pipe 8. At any rate, the fuel in the fuel regulating container 2 is not only sucked into the Venturi tube 3 through the nozzle 4 but also positively sucked into the logic element through the control pipe 8 and returned to the fuel tank 6 through the return pipe 10. When excess fuel in the fuel regulating container 2 is successively sucked into the logic element and returned to the fuel tank 6 in the manner described and the fuel level A—A falls below the set liquid level H—H, the fuel is no longer sucked up through the control pipe 8 and air is sucked into the control pipe. Therefore, the low pressure vortex so far appearing in the wall attachment logic element 1 under the Coanda effect is destroyed and the wall attachment phenomenon disappears, with the result that the fuel passing through the supply part 11 start to flow straight forward to be admitted into the output duct 14.

In the manner described, a large quantity of fuel is supplied into the fuel regulating container 2 through the supply pipe 9 whenever the fuel in said container is short, whereas when the quantity of fuel stored in the fuel regulating container 2 becomes excessively large on the contrary, the fuel is positively sucked into the logic element through the control pipe 8, whereby the fuel level A—A in said container is always maintained at the set liquid level H—H. In this case, if the apparatus is constructed such that some quantity of fuel flows into both the output ducts 14 and 15 in either case of the fuel in the fuel regulating container being short or superfluous, as described above, the main flow of fuel will be shifted from the output duct 14 to the output duct 15 or vice versa smoothly instantaneously.

Although in the embodiment described above, the fluidic element is arranged in the apparatus in a vertical position, it will be obvious to those skilled in the art that the fluidic element may be arranged in a horizontal position or in any other position and in any direction depending upon the arrangement of the other components of the apparatus.

The second embodiment of the present invention will be described hereunder: Referring to FIG. 4, reference numeral 101 designates a wall attachment logic element, 102 a fuel regulating container (an example of the liquid level controlling container) corresponding to the conventional float chamber, 103 a Venturi tube, 104 a nozzle, 105 a throttle, 106 a fuel tank and 107 a fuel pump by which fuel is supplied from the fuel tank 106. The wall attachment logic element 101 has a supply port 111 connected with the fuel pump 107, control ports 112 and 113, output ports 119 and 120, and a supply duct 123, control ducts 121 and 122, and output ducts 114 and 115, which are connected with the respective ports.

This wall attachment logic element 101 has asymmetrical characteristics and is so constructed that, when the pressures acting in control pipes 117 and 118 are equal, the Coanda effect is produced in the control port 113 and an output is obtained only from the output duct 115.

Various constructions are considered to impart asymmetrical characteristics to the wall attachment logic element and this will be explained with reference to FIG. 7. The reference numerals shown in FIG. 7 indicate the same elements as those mentioned above with the same reference numerals. The construction shown in FIG. 7 has asymmetrical characteristics with which a predominantly strong output is developed from the output duct 115 under normal condition, (i.e. when the same pressure acts in both the control ports 112 and 113).

(1) The nozzle direction of the supply duct 123 is previously inclined toward the output duct 115 by an angle $\theta$ (the value of which is very small though optionally selected according to the conditions under which the logic element is used).

(2) The diameter $a_{13}$ of the control duct 122 is made smaller than the diameter $a_{12}$ of the control duct 121 so that a greater negative pressure may appear in the control duct 123. Although the duuts have been described as being circular in cross-section, the control ducts are generally rectangular in cross-sectional shape and, in this case, the cross-sectional area of the duct 122 is made smaller than that of the duct 121 so as to make the flow resistance of the duct 122 greater than that of the duct 121, as will be obvious to those skilled in the art.

(3) The diameter (or the distance between the upper wall and the lower wall where the cross-sectional shape is rectangular) $b_{13}$ of the control duct 122 is made smaller than the similar dimension $b_{12}$ of the control duct 121, and the inner wall of the output duct 115 is partially formed close to the control duct 122 so as to facilitate the occurrence of the Coanda effect.

(4) The amount of offset $C_{14}$ of the outer wall of the output duct 114 is made larger than the amount of offset $C_{15}$ of the outer wall of the output duct 115.

The above-described constructions may be combined for obtaining these asymmetrical characteristics. Further, when both of the control pipes 117, 118 are submerged into the liquid, it is possible to arrange such that the fuel emerging from the supply port 111 is admitted only into the output duct 115. At any rate, the present invention does not intend to restrict the construction of the fluidics proper but it is only necessary to impart such asymmetrical characteristics as described above to the wall attachment logic element. Turning back to FIG. 4, reference numeral 118 designates a control pipe connected to the control port 113 at one end, with the other end thereof being located at a predetermined depth in the fuel regulating container 102. This position of the other end of the control pipe 118 is the position of the fuel level to be maintained in the fuel regulating container 102, i.e. the set liquid level H—H, which is previously set in the design stage. Reference numeral 109 designates a pipe (hereinafter referred to as a supply pipe) communicating the output port 119 with the fuel regulating container 102, and reference numeral 110 designates a pipe (hereinafter referred to as a return pipe) having one end connected to the output port 120 and the other end to the fuel tank 106. The upper portion of the fuel regulating container 102 is communicated with the atmosphere. In the embodiment shown, the control pipe 118 is shown as extending downwardly toward the surface of fuel, but it will be obvious that said control pipe 118 may be extended with its open end projecting above the surface of fuel. The control pipe 117 has one end connected to the control port 112, with the other end thereof extending deep into the fuel regulating container 102.

The operation of the apparatus constructed as described above will be explained. In FIG. 4, the fuel in the fuel tank 106 is introduced into the wall attachment logic element 101 with pressure by means of the fuel pump 107. The fuel is reulated in the wall attachment logic element 101 and discharged into the fuel regulating container 102 through the supply pipe 109. Excess fuel is returned to the fuel tank 106 through the return pipe 110. The fuel in the fuel regulating container 102 is sucked into the Venturi tube 103 by the effect of a negative pressure developed in said Venturi tube by reason of the velocity of air passing therethrough, and mixed with air to be supplied into the fuel chambers of the associated engine.

Figure 5:
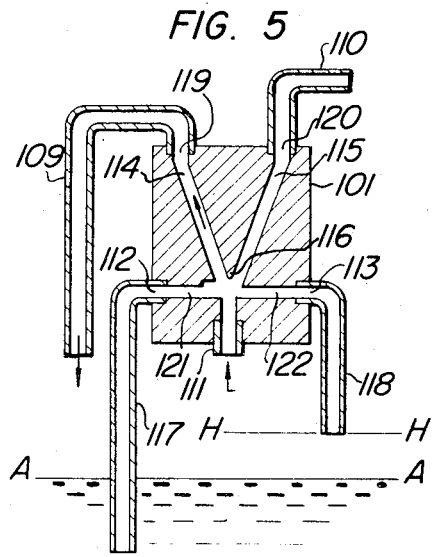
FIG. 5 is an illustrative view showing the flow of fluid in the fluidic element of the apparatus of FIG. 4 when the liquid level is below the predetermined level.
Figure 6:
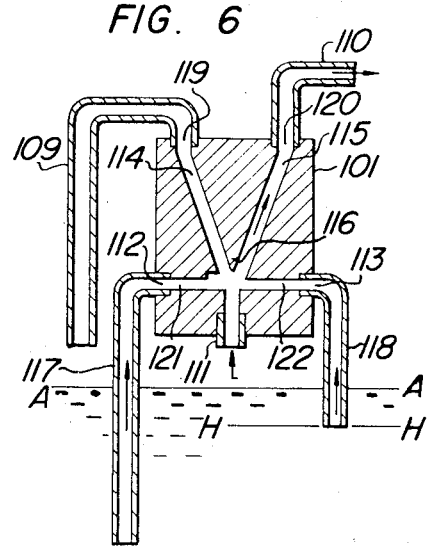
FIG. 6 is an illustrative view showing the flow of fluid in the fluidic element of the apparatus of FIG. 4 when the liquid level is above the predetermined level.

Now, the function of the wall attachment logic element 101 will be explained with reference to FIGS. 5 and 6. FIG. 5 shows the case when the fuel in the fuel regulating container 102 is short and FIG. 6 shows the case when the fuel in the fuel regulating container 102 is superfluous.

In the case of FIG. 5, since the fuel is short and the actual fuel level A—A is located below the set liquid level H—H, the control pipe 118 is opened into the atmosphere and the pressure acting in the control port 113 is substantially equal to the atmospheric pressure.

However, the control pipe 117 is submerged into the fuel. Therefore, a negative pressure appears in the control port 112 and the fuel flow passing through the supply port 11 is deflected toward the control duct 121. Once the fuel is attached to the wall, it continuously flows into the output duct 114 steadily under the Coanda effect. In this case, not the entire fuel flows into the output duct 114 but part thereof concurrently flows into the output duct 115, depending upon the amount of offset of the splitter 116. Thus, the entire or major part of the fuel delivered with pressure from the fuel pump flows into the output duct 114 and discharged therefrom to be supplied into the fuel regulating container 102 through the supply pipe 109. The apparatus is obviously designed such that the flow rate of fuel supplied through the supply pipe 109 into the fuel regulating container 102 is higher than the maximum flow rate of fuel sucked into the Venturi tube 103 from the nozzle 104 in this case.

The function of the wall attachment logic element 101 in the case wherein the quantity of fuel in the fuel regulating container 102 is conversely superfluous, will be explained with reference to FIG. 6. When the fuel is supplied into the supply port 111 and flows therein at a certain velocity, a negative pressure appears at the point of divergence of the control ducts 121, 122. Since the control pipes 117, 118 are submerged into the fuel, the fuel in the fuel regulating container 102 is sucked into the control ducts 121, 122.

However, because of the asymmetrical characteristics imparted to the wall attachment logic element 101, the fuel flow passing through the supply port 111 and the duct 123 is deflected toward the control duct 122 to be admitted into the output duct 115. The fuel flow once directed to the output duct 115 continues to flow into said output duct 115 steadily also under the Coanda effect well known in the art. The fuel in the fuel regulating container 102 is also sucked up and flows into the output duct 115 by the effect of the negative pressure developed at the point of divergence of the control ducts 121, 122. In this case, the wall attachment logic element 101 may be designed such that not the entire fuel flows into the output duct 115 but part thereof concurrently flows into the output duct 114. Of course, the quantity fuel flowing into the output duct 114 is made smaller than the quantity of fuel being sucked up through the control pipes 117, 118. In either case, the fuel in the fuel regulating container 102 is not only sucked into the Venturi tube 103 through the nozzle 104 but also positively sucked up through the control pipes 117, 118 and returned to the fuel tank 106 through the return pipe 110. Thus, the excess fuel in the fuel regulating container 102 is successively sucked up and returned to the fuel tank 106. When the fuel level A—A falls below the set liquid level H—H, the fuel is no longer sucked into the logic element through the control pipe 118 but air is sucked thereinto. As a result, the low pressure vortex formed on the side wall of the output duct 115 under the Coanda effect is destroyed and the wall effect disappears, so that the fuel flow passing through the supply port 111 is deflected toward the output duct 114 by the effect of the negative pressure appearing in the control duct 121.

As described above, when the fuel in the fuel regulating container 102 is short, a large quantity of fuel is supplied into the fuel regulating container 102 through the supply pipe 109, whereas when the fuel is said fuel regulating container 102 is superfluous on the contrary, it is positively sucked into the logic element through the control pipes 117, 118, whereby the fuel level A—A in said container is always maintained at the set liquid level H—H.

When the open ends of the control pipes 117, 118 are both located in the atmosphere as in the state immediately after the carburetor is mounted on an engine, the fuel emerging from the supply port 111 proceeds straight forward without attaching to either the left or right side wall.

If, in this case, an arrangement is made such that the fuel passing through the supply port 111 is partially introduced into the output duct 114, by suitably selecting the position of the tip end of the splitter 116, the fuel is accumulated in the fuel regulating container 102 through the supply pipe 109.

Once the fuel level in the fuel regulating container 102 has reached the open end of the control pipe 117, the above-described controlling cycle is repeated thereafter.

Although in the embodiment described above, the fluidic element is arranged in the apparatus in a vertical position, it is to be understood that said fluidic element may be arranged in a horizontal position or in any other position and in any direction depending upon the arrangement of the other components of the apparatus.

As described hereinabove, the liquid level controlling apparatus according to the present invention does not include any movable elements, unlike the conventional one utilizing a float. Therefore, the apparatus is highly responsive to a liquid level variation and also excellent in durability. In addition, since the main jet passing through the supply port and the controlling jet passing through the control port of the fluidic element are both the liquid per se whose surface level is to be controlled, there is no necessity of providing an additional power source for supplying the controlling jet. In the conventional method, when the liquid level has risen too high, no action could be taken other than just waiting for the liquid level to fall upon consumption of the fuel. According to the present invention, however, the fuel is conversely drawn out from the container in such a case. Therefore, by practicing the present invention the function of positively maintaining the liquid level at a set level in either case when the liquid level is too high or too low relative to said set level can be obtained at all times, i.e. the so-called positive control becomes possible.

Further, if the liquid level controlling apparatus of the invention is used as a carburetor fuel controlling apparatus for internal combustion engines of vehicles or other travelling equipments, the provision of a float chamber, a float and a needle valve of the conventional carburetor and the mechanisms associated therewith, becomes unnecessary and, instead, a fuel regulating container and a fluidic element of very simple construction, of the type described above are only needed. As such, when the apparatus of the invention is used in travelling equipments, it not only is invulnerable against any vibration or shock given thereto, but also does not call for a needle valve which is required to be highly precise, and hence can be produced at a very low cost. Furthermore, since no needle valve is required, there is no fear of the apparatus becoming inoperable as is in the case of the conventional apparatus which has been rendered inoperable by dusts clogging the needle valve. The apparatus of the invention is also completely free of erroneous operation caused by resonance even when it is used in automobiles which vibrate intensely, since it does not include a float. The apparatus of the invention also has such an outstanding advantage as will be described hereunder: namely, in the conventional apparatus the distance between the nozzle opening and the float is so large that, when an automobile or the like in which the apparatus is mounted is inclined, the carbuetor is also inclined and the controlled surface of fuel inevitably deviates largely from the set level H—H even when the operation of the float is normal. According to the apparatus of the instant invention, however, since the height of the liquid level to be controlled is determined by the position of the opening of the control pipe, such disadvantage can be eliminated readily by getting said control pipe as close to the Venturi tube as possible. In fact, the control pipe can be extremely small as compared with the conventionally used float and, depending upon the design of the carburetor, it is even possible to make $L<l_{1/2}$. The fact that the control pipe can be provided close to the Venturi tube, also enables the height difference $h$ between the open end of the nozzle and the set liquid level H—H to be decreased. Therefore, the trouble which is usually encountered during shifting of an internal combustion engine for automobiles from fuel jetting for slow system to fuel jetting for main system, can be substantially minimized.

From the foregoing description, it will be seen that according to the present invention a liquid level controlling apparatus can be obtained which is not only excellent in construction, durability and stability but also highly reliable.

What is claimed is:

1. A liquid level controlling apparatus comprising a fuel tank, a fuel supply pump connected in series with said fuel tank, a fluidic element and a fuel regulating container, said fluidic element having a supply port connected with said fuel supply pump, a supply duct extending in said fluidic element from said supply port being branched into control ducts extending to a plurality of control ports and output ducts extending to a plurality of output ports, each of said control ports being connected with each of control pipes extending into said fuel regulating container, and one of said output ports being connected with a return pipe connected with said fuel tank and another one thereof being connected to a supply pipe extending into said fuel regulating container; said fluidic element having asymmetrical characteristics; the free end of one of said control pipes being open at a set liquid level in said fuel regulating container and the free end of another one thereof being submerged into fuel in said fuel regulating container.

2. A liquid level controlling apparatus as defined in claim 1, wherein a throttle is formed at a portion of said fuel regulating container and a nozzle extends from said throttle to a carburetor.

3. A liquid level controlling apparatus comprising a fuel tank, a fuel supply pump connected in series with said fuel tank, a fluidic element having symmetrical characteristics, and a fuel regulating container, said fluidic element having a supply port in communication with said fuel supply pump, a supply duct extending in said fluidic element from said supply port being branched into control ducts extending to a plurality of control ports and output ducts extending to a plurality of output ports, one of said control ports being connected with a control pipe extending into said fuel regulating container so as to locate an open end thereof on a set level of fuel in said fuel regulating container, and one of said output ports being through a return pipe connected with said fuel tank and another one thereof being connected with a supply pipe extending from said fuel regulating container and located above said set liquid level.

4. A liquid level controlling apparatus as defined in claim 3, wherein another one of said control ports is opened to the atmosphere.

5. A liquid level controlling apparatus as defined in claim 3, wherein the free end of a control pipe connected with another one of said control ports is submerged into fuel in said fuel regulating container.

6. A liquid level controlling apparatus as defined in claim 3, wherein a throttle is formed at a portion of said fuel regulating container and a nozzle extends from said throttle to a carburetor.

References Cited

UNITED STATES PATENTS

| 3,547,414 | 12/1970 | Nard | 137—815 X |
|---|---|---|---|
| 3,386,709 | 6/1968 | Drayer | 137—815 X |
| 3,477,699 | 11/1969 | Drayer | 261—36 A |
| 3,567,191 | 3/1971 | Morgan | 261—36 A |
| 3,581,754 | 6/1971 | Adams | 137—81.5 |
| 3,590,840 | 7/1971 | Hyer | 137—81.5 |
| 3,599,941 | 8/1971 | Becker | 137—81.5 X |

SAMUEL SCOTT, Primary Examiner

U.S. Cl. X.R.

261—36 A